United States Patent Office 3,671,324
Patented June 20, 1972

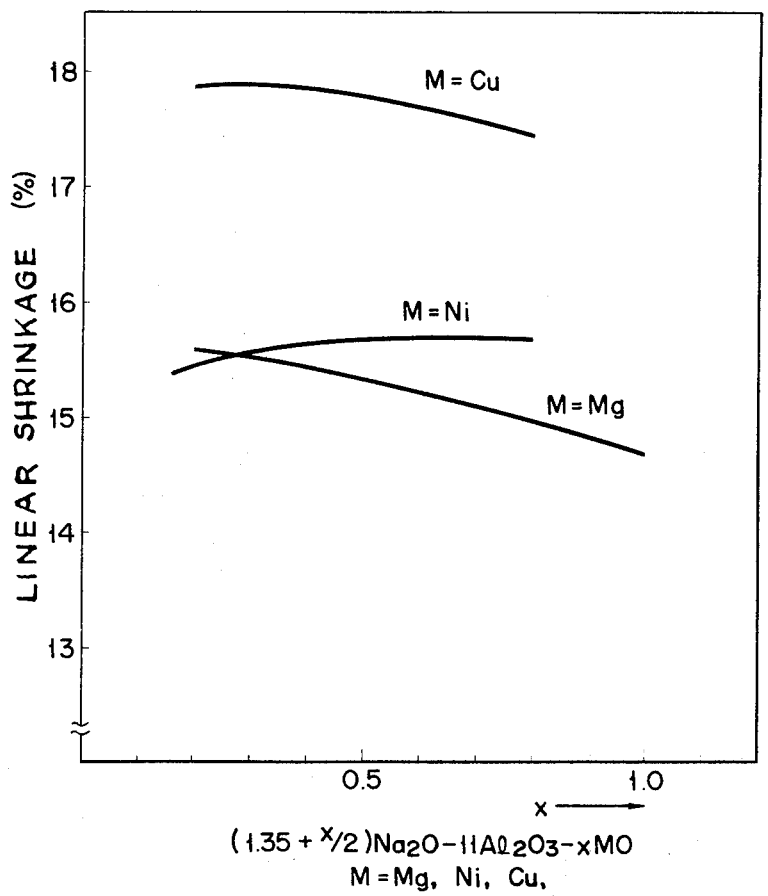

3,671,324
SOLID ELECTROLYTE
Atsuo Imai, Mituo Harata, Yoshitaka Ogawa, and Shoji Hasegawa, Yokohama, Japan, assignors to Tokyo Shibaura Electric Co., Ltd., Kawasaki-shi, Japan
Filed June 2, 1970, Ser. No. 42,792
Claims priority, application Japan, June 5, 1969, 44/43,635
Int. Cl. H01m 43/06
U.S. Cl. 136—153         2 Claims

ABSTRACT OF THE DISCLOSURE

In the β-alumina solid electrolyte using the phenomenon of conduction of $Na^+$ ion, a solid electrolyte formed by adding and baking 0.9 to 20 mol percent of CuO calculated in terms of the amount of a mixture of $Na_2O$, $Al_2O_3$ and CuO.

BACKGROUND OF THE INVENTION

This invention relates to solid electrolytes and particularly to a β-alumina solid electrolyte having excellent electrical conductivity and sintering property, which is suited for use, for example, in Na-S batteries.

β-Alumina is known to be a solid electrolyte having a good conductivity of $Na^+$ ion. The crystal system of β-alumina is in a hexagonal form, and no electrical conductivity due to the movement of electrons is observed. However, in the basal plane, the mobility of $Na^+$ ion is large, and electrical conductivity due to the movement of $Na^+$ ion is about $0.03\Omega^{-1}$ cm.$^{-1}$ at room temperature and about $0.3\Omega^{-1}$ cm.$^{-1}$ at 300° C. On the other hand, $Na^+$ ions do not at all move in the direction of the basal axis. Since β-alumina has a high conductivity of $Na^+$ ion, a battery can be constructed by positioning β-alumina between an anode of molten metal sodium and a cathode of sulphur.

Further, β-alumina functions as a secondary battery or a storage battery by being sandwiched between plates of alkali ferrite, and a sintered mass of β-alumina is used for this purpose. The orientation of fine crystals forming the mass is not generally constant. Thus the electrical conductivity of the sintered mass of β-alumina is less than the value obtained in the basal plane of a single crystal, and is of the order of $0.01$–$0.1\Omega^{-1}$ cm.$^{-1}$ at 300° C. although it is more or less dependent upon the state of sintering.

It is generally desired that the conductivity of β-alumina is high when the conduction of $Na^+$ ion is to be utilized. It is known that the conductivity of $Na^+$ ion can be promoted by the addition of magnesium oxide to β-alumina. More particularly, the electrical conductivity of the sintered mass without any additive ranges 0.001 to $0.002\Omega^{-1}$ cm.$^{-1}$, while when MgO is added the same can be increased to about $0.005\Omega^{-1}$ cm.$^{-1}$ at room temperature by properly selecting the amount to be added. Addition of Mg to β-alumina may create an advantage in respect of electrical conductivity, but produces the disadvantages that sintering property is inferior, physical strength is poor and that considerably high sintering temperature is required, all due to a low degree of shrinkage.

SUMMARY OF THE INVENTION

The invention contemplates eliminating these drawbacks and has as an object to provide a β-alumina solid electrolyte having a high ion conductivity and an excellent sintering property.

Accordingly, the invention provides a β-alumina solid electrolyte utilizing the phenomenon of conduction of $Na^+$ ion, wherein 0.9 mol percent to 20 mol percent of CuO is added and baked, said amount being calculated in terms of the amount of a mixture of NaO, $Al_2O_3$ and CuO.

BRIEF EXPLANATION OF THE DRAWING

The single figure shows a comparative curve diagram representing the solid electrolyte according to this invention and a conventional one in terms of the rate of shrinkage.

DETAILED DESCRIPTION OF THE INVENTION

The invention will now be described in connection with a preferred embodiment thereof.

To a β-alumina powder of a particle size of about 1.2μ are added an additive to be described later and sodium carbonate. The powdery mixture is press molded into a pressed mass. The powdery mass is then subjected to preliminary sintering by placing it in a sealed envelope and heating it for one hour at a temperature of 1400° C. The sintered mass is pulverized and press molded again to form a pressed mass. The mass thus obtained is introduced into a sealed envelope and baked for four hours at 1650° C., avoiding a loss of sodium due to evaporation. The ratio of mixed ingredients of the baked mass and the electrical conductivity thereof by $Na^+$ ion at 350° C. was measured using molten sodium as electrodes. The results are shown below.

| Example | β-Alumina (mol percent) | Additives (mol percent) | Sodium carbonate (mol percent) | Electrical conductivity at 350° C. ($\Omega^{-1}$cm.$^{-1}$) |
|---|---|---|---|---|
| 1 | 87.6(98.8) | | 12.4(1.2) | $4.5 \times 10^{-2}$ |
| 2 | 75.7(75.7) | CuO: 9.1(0.96) | 15.(15.2) | $5.3 \times 10^{-2}$ |
| 3 | 69.4(69.6) | NiO: 13.9(1.6) | 16.7(1.8) | $5.6 \times 10^{-2}$ |
| 4 | 69.4(69.6) | CuO: 13.9(1.6) | 16.7(1.8) | $6.5 \times 10^{-2}$ |
| 5 | 57.5(94.4) | CuO: 23.0(3.1) | 19.5(2.5) | $8.6 \times 10^{-1}$ |
| 6 | 42.7(90.2) | CuO: 34.2(5.9) | 23.1(3.9) | $1.00 \times 10^{-2}$ |
| 7 | 37.9(88.2) | CuO: 37.9(7.2) | 24.2(4.6) | $1.01 \times 10^{-1}$ |
| 8 | 21.1(76.7) | CuO: 50.6(15.0) | 28.3(8.3) | $5.9 \times 10^{-2}$ |
| 9 | 16.8(71.2) | CuO: 54.0(18.6) | 29.2(10.2) | $5.1 \times 10^{-2}$ |
| 10 | 5.1(39.8) | CuO: 62.6(40.0) | 32.3(20.2) | (¹) |

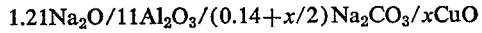
¹ Immeasurable due to Na attack on sample.

The values in the parentheses represent those in mol percent in the case where the mixture should consist of $Na_2O$, $Al_2O_3$ and NiO or CuO. In the table, Example 1 shows a case in which no additive is used, Example 3 a case in which NiO is added as the additive, and Example 10 a case where the additive is used in an excess amount lying outside the scope of the invention. These examples are shown for the purpose of comparison, the result being directed to this invention.

In the composition of each of the species given in the table, sodium was introduced in order to compensate the lack of valence due to the introduction of Cu(divalent) to the position of Al(trivalent) in the crystalline lattice of β-alumina. The ratio of incorporation is as follows.

$$1.21Na_2O/11Al_2O_3/(0.14+x/2)Na_2CO_3/xCuO$$

It has been found through experiments that the ratio of $Na_2O$ and $Al_2O_3$ is preferably from 1.41:11 to 3.11:11, respectively as the amount of incorporation of CuO increases from 0.9 mol percent to 20 mol percent.

In addition to sodium carbonate as described above, sodium salts such as sodium nitrate, sodium sulfate, sodium oxalate, sodium chloride or the like may be used as the source of supply of sodium.

"$1.21Na_2O \cdot 11Al_2O_3$" indicates the chemical composition of the β-alumina used, and x represents the amount of CuO added. The amount of sodium carbonate to be incorporated consists of the amount (x/2) of Na to be introduced into the crystalline lattice of the β-alumina and the amount (0.14) thereof to be decreased due to evaporation during the baking process.

When the amount of Na is less than the ratio given above, $CuAl_2O_4$ is observed in the phase of formation, while an excess amount results in the production of NaAlO₂. In either case, the substance produced will act to increase the resistivity of the electrolyte.

An increase in the electrical conductivity of β-alumina is entirely dependent upon Na⁺ ion. In order to ascertain that the contribution of electronic conduction can be ignored, variation of current on a time basis was measured by applying a DC electric field to electrodes vapor-deposited with gold at both ends of a rod-shaped specimen piece. It was observed that the intensity of the current decayed as the time lapsed and was less than 0.3% of the initial current after about three hours in respect of all of the specimen pieces. In other words, since Na⁺ ion was only concerned with the current, the external electrical field was gradually canceled by the polarization due to movement of the Na⁺ ion, thus resulting in sharp decay in current. This shows that electronic conduction can be ignored in the examples described and that an increase in electrical conductivity can be taken as an increase in ion conduction.

X-ray diffraction analysis of each specimen indicates that only a so-called β-alumina phase (equivalent to $Na_2O \cdot 11Al_2O_3$) is observed when the amount of the additive which is calculated as being mixed with $Na_2O$, $Al_2O_3$ or the like is 6 mol percent and that a phase equivalent to $Na_2O \cdot 5Al_2O_3$ is observed with the amount in excess of that range.

If the amount exceeds 20 mol percent, spinel and sodium aluminate begin to be produced to co-exist and will degrade electrical conductivity. Further, when the additive, i.e. CuO, amounts to more than 40 mol percent, the substances formed will consist of spinel, sodium aluminate and the additive itself, so that they exhibit no anti-corrosive power to metal sodium and hence can not be applied to Na-S batteries. No sufficient advantage can be expected when the amount of incorporation of CuO is less than 0.9 mol percent.

In order to explain the sintering property of the β-alumina, the rates of shrinkage thereof with the addition thereof of Ni, Mg and Cu, respectively, will be compared in the drawing. The figure shows the rates of shrinkage of β-alumina having a particle size of 1.2μ in respect of compositions of baked material added with the above-described impurities together with sodium. Baking was effected for four hours at 1700° C. in respect of β-alumina added with Ni or Mg, and for four hours at 1650° C. when copper was added.

The figure clearly shows that shrinkage is larger when copper is added than when either of magnesium or nickel is employed. Such very large shrinkage is measured in spite of the low baking temperature. The degree of shrinkage will thus be furthered if comparison is made at a temperature of 1700° C.

Shrinkage was also measured on a pressed mass sintered for two hours at 1600° C. and found to be 16.7%, the mass being formed of 42.7 mol percent β-alumina, 34.2 mol percent copper oxide, and 23.1 mol percent sodium carbonate. The shrinkage was superior to that of a pressed mass baked at 1700° C. for four hours, and porcelain having sufficiently low porosity could be obtained. The electrical conductivity was measured at 350° C. to be $8.1 \times 10^{-2} \Omega^{-1}$ cm.$^{-1}$.

β-Alumina is required to have sufficiently low internal resistivity and a large physical rigidity so as to be suited for a solid electrolyte. In order to satisfy these conditions, a sintering temperature above 1700° C. is necessary when MgO is to be added. When CuO is used, however, a temperature of 1600° C. for sintering is sufficient to achieve the purposes, and hence the use of this material is particularly advantageous to manufacture.

It will be apparent from the foregoing description that the invention provides a high ion conductivity and yet far excellent sintering property in comparison with prior art β-alumina solid electrolytes.

What we claim is:

1. A β-alumina solid electrolyte that functions by Na⁺ ion conduction consisting essentially of $Na_2O$, $Al_2O_3$ and CuO containing between 0.9 and 20 mol percent of CuO based on the total amount of combined $Na_2O$, $Al_2O_3$ and CuO.

2. A solid electrolyte as claimed in claim 1 wherein the ratio $Na_2O:Al_2O_3$ is between 1.41:11 and 3.11:11 in proportion to the increase in CuO therein.

References Cited
UNITED STATES PATENTS

| | | | |
|---|---|---|---|
| 3,535,163 | 10/1970 | Dzieciuch et al. | 136—153 |
| 3,244,539 | 4/1966 | Hare | 106—65 |
| 3,287,284 | 11/1966 | Norman | 106—55 |

DONALD L. WALTON, Primary Examiner

U.S. Cl. X.R.

106—65; 252—518